United States Patent
Fukui et al.

(10) Patent No.: US 7,854,302 B2
(45) Date of Patent: Dec. 21, 2010

(54) APPARATUS FOR MOUNTING A HUB BRAKE TO A BICYCLE FRAME

(75) Inventors: Seiji Fukui, Shimonoseki (JP); Keiji Matsueda, Shimonoseki (JP); Keita Tanaka, Shimonoseki (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 44 days.

(21) Appl. No.: 12/345,403

(22) Filed: Dec. 29, 2008

(65) Prior Publication Data

US 2009/0120737 A1    May 14, 2009

Related U.S. Application Data

(62) Division of application No. 10/908,399, filed on May 10, 2005, now Pat. No. 7,568,558.

(30) Foreign Application Priority Data

May 14, 2004    (JP) .............................. 2004-144442

(51) Int. Cl.
   *B62L 5/00*    (2006.01)
   *F16H 7/14*    (2006.01)
(52) U.S. Cl. ......................................... 188/26; 474/116
(58) Field of Classification Search .................... 188/26; 474/116
   See application file for complete search history.

(56) References Cited

U.S. PATENT DOCUMENTS

| 0,483,621 A | | 10/1892 | Reaney |
| 641,637 A | * | 1/1900 | Caswell ....................... 474/116 |
| 1,045,194 A | | 11/1912 | Sachs |
| 1,456,103 A | | 5/1923 | Goodchild |
| 2,084,507 A | | 6/1937 | Scaison |
| 2,084,508 A | | 6/1937 | Scaison |
| 2,895,576 A | | 7/1959 | Schwerdhofer |
| 3,828,895 A | | 8/1974 | Boaz |

(Continued)

FOREIGN PATENT DOCUMENTS

DE    101111    5/1897

(Continued)

OTHER PUBLICATIONS

European Search report for EP 05010499.1, the European application that corresponds to the parent of this application, dated Apr. 11, 2006.

*Primary Examiner*—Bradley T King
*Assistant Examiner*—Mahbubur Rashid
(74) *Attorney, Agent, or Firm*—James A. Deland (57) ABSTRACT

A bicycle brake apparatus comprises a securing bracket with an axle opening dimensioned to receive a bicycle wheel hub axle therethrough, a braked member that has a braking surface and is adapted to rotate with a bicycle wheel hub rotatably supported by the hub axle, a braking member adapted to contact the braking surface, and an operating unit that selectively causes the braking member to contact the braking surface. A locking unit is structured for attachment to the securing bracket, wherein the locking unit extends in an axial direction of the hub axle and is dimensioned to nonrotatably engage the bicycle frame radially inwardly of a rotating portion of the brake apparatus.

23 Claims, 11 Drawing Sheets

U.S. PATENT DOCUMENTS

| | | | |
|---|---|---|---|
| 4,591,027 A | 5/1986 | Takamiya et al. | |
| 5,673,773 A * | 10/1997 | Lai | 188/24.17 |
| 6,837,341 B2 | 1/2005 | Matsueda | |
| 2003/0230457 A1 | 12/2003 | Matsueda | |

FOREIGN PATENT DOCUMENTS

| | | |
|---|---|---|
| DE | 20002512 U1 | 6/2001 |
| EP | 1375331 A1 | 1/2004 |
| FR | 975032 | 2/1951 |
| GB | 412355 | 6/1934 |
| JP | 59-151886 U | 10/1984 |
| TW | 481151 U | 3/2002 |

\* cited by examiner

APPARATUS FOR MOUNTING A HUB BRAKE TO A BICYCLE FRAME

BACKGROUND OF THE INVENTION

The present invention is directed to bicycles and, more particularly, to an apparatus for mounting a wheel hub brake to a bicycle frame.

Bicycle braking devices currently available include rim braking devices and hub braking devices. Rim braking devices include cantilever brakes and caliper brakes that brake the wheel rim. Hub braking devices brake the wheel hub, and they include drum brakes, band brakes, roller brakes and the like. Since hub braking devices brake the wheel hub rather than the wheel rim, such devices are able to provide braking even if the wheel rim is warped.

Conventional bicycle hub braking devices comprise a securing bracket nonrotatably mounted to the bicycle frame, a brake drum that rotates integrally with the wheel hub, brake shoes that provide a braking action on the brake drum, and a brake operating unit that selectively brings the brake shoes into pressing contact with the braking surface of the brake drum. The securing bracket has a base unit with a hub axle opening through which the hub axle passes, an arm that extends radially outwardly from the base unit, and a locking part that is disposed at the end of the arm. The locking part is used to nonrotatably mount the securing bracket to the bicycle frame by attaching the locking part to a bracket securing part fixed to the front fork or to the chain stay of the bicycle. The bracket securing part may be a part that is welded to the frame or a part that secures the securing bracket to the frame via a band.

If the bicycle wheel includes a quick-release hub that enables the wheel to be quickly and easily removed from and reattached to the bicycle frame, a securing bracket that is banded to the frame still must be removed and reattached using tools. Such additional work is very inconvenient. To reduce such additional work, Japanese Laid-Open Patent Application No. 2004-010007 discloses a bracket securing part, provided by the brake manufacturer or the bicycle manufacturer, that that may be welded to the frame. A locking space is formed inside the bracket securing part, and the locking part disposed at the end of the arm of the securing bracket is inserted from the bottom for the bracket securing part into the locking space to attach the securing bracket to the frame.

Whether the bracket securing part is banded or welded to the frame, the bracket securing part is an extra component, and both the bracket securing part and the securing bracket must be attached to the frame using a complex operation. In any case, the arm of the securing bracket that must extend radially from the base unit restricts the design of the securing bracket, makes the securing bracket visually unattractive, and clutters the bicycle frame.

SUMMARY OF THE INVENTION

The present invention is directed to various features of an apparatus for mounting an internal hub brake to a bicycle frame. In one embodiment, a bicycle brake apparatus comprises a securing bracket with an axle opening dimensioned to receive a bicycle wheel hub axle therethrough, a braked member that has a braking surface and is adapted to rotate with a bicycle wheel hub rotatably supported by the hub axle, a braking member adapted to contact the braking surface, and an operating unit that selectively causes the braking member to contact the braking surface. A locking unit is structured for attachment to the securing bracket, wherein the locking unit extends in an axial direction of the hub axle and is dimensioned to nonrotatably engage the bicycle frame radially inwardly of a rotating portion of the brake apparatus. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
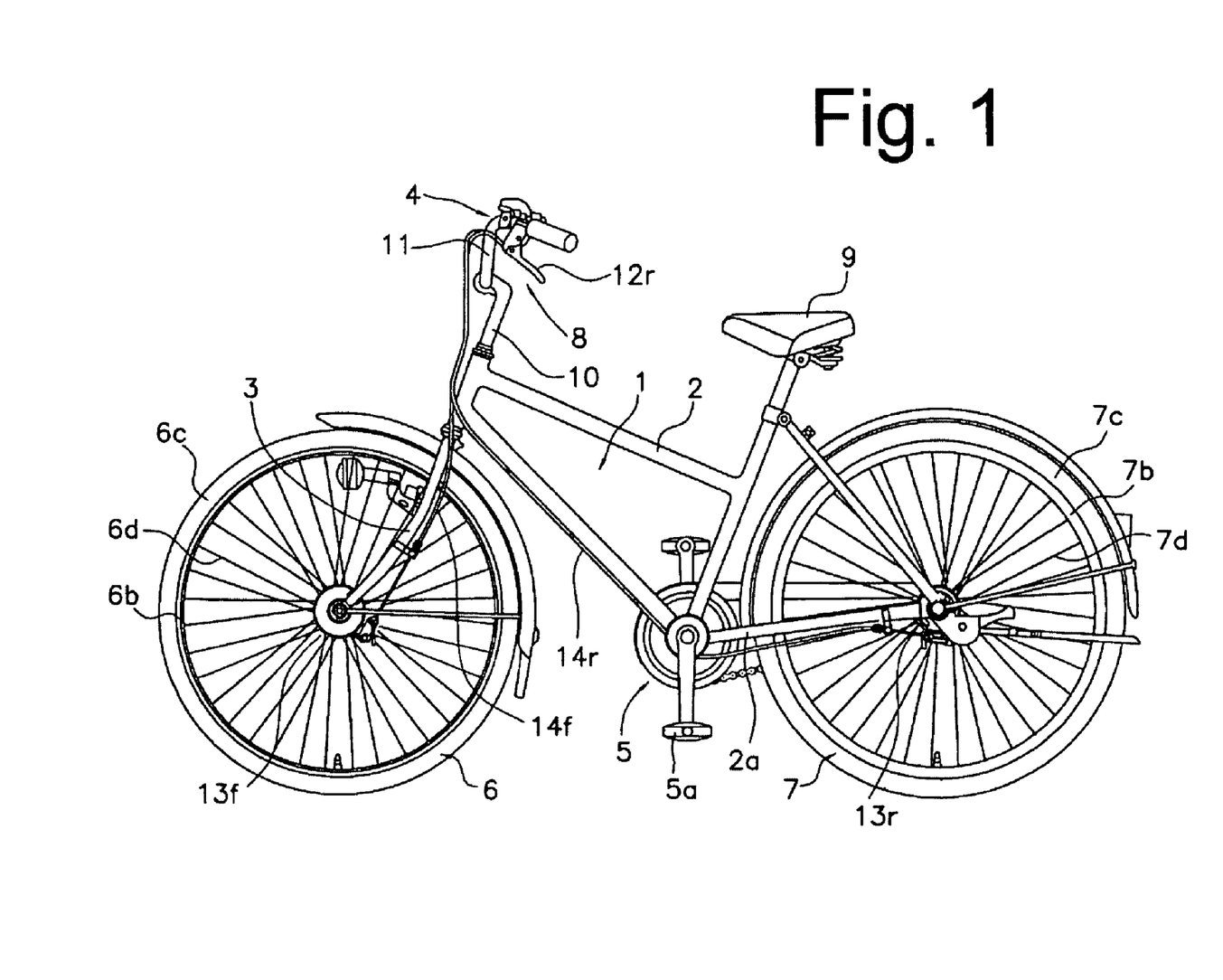
FIG. 1 is a side view of a particular embodiment of a bicycle that includes braking components described herein.

FIG. 1 is a side view of a particular embodiment of a bicycle that includes braking components described herein. In this embodiment, the bicycle comprises a frame 1 that has a frame body 2 and a front fork 3; a handlebar assembly 4 comprising a handle stem 10 fastened to the top of front fork 3 and a handlebar 11 fastened to handle stem 10 for steering; a saddle 9 for sitting; a front wheel 6; a rear wheel 7; a brake system 8 for braking front wheel 6 and rear wheel 7; and a drive section 5 for transmitting rotation of pedals 5a to rear wheel 7.

Figure 3:
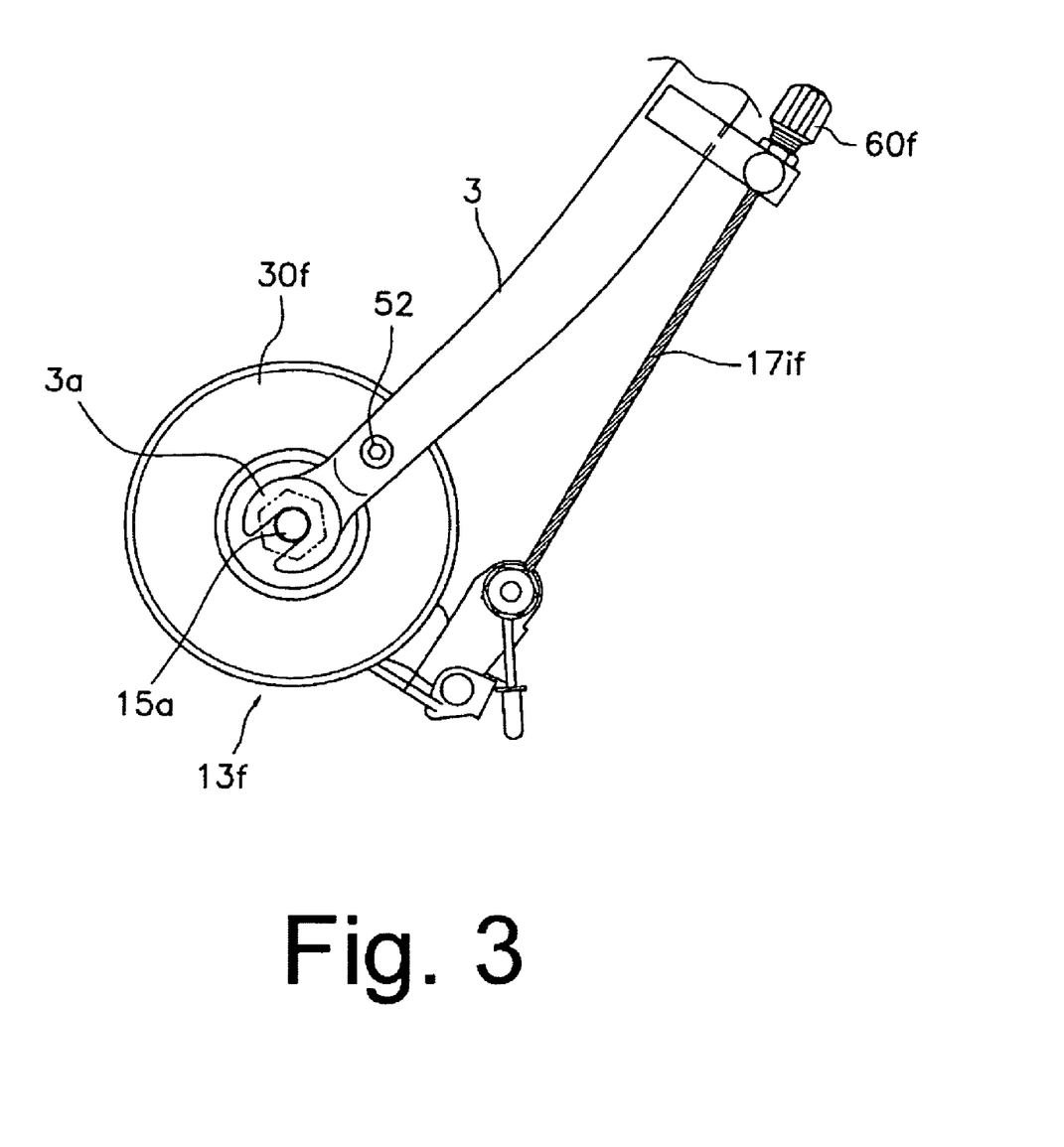
FIG. 3 is a side view of a particular embodiment of a front brake device.
Figure 4:
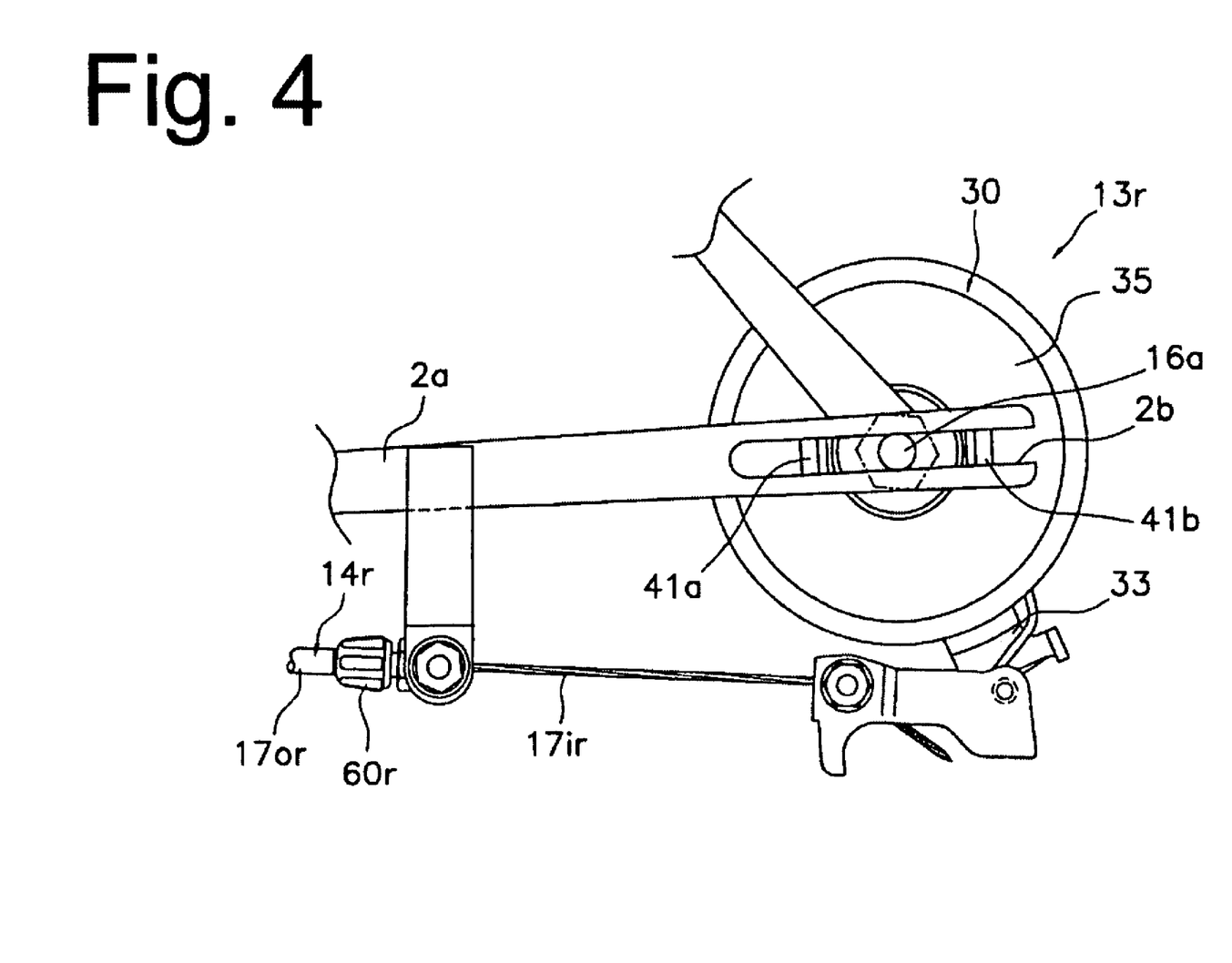
FIG. 4 is a side view of a particular embodiment of a rear brake device.
Figure 6:
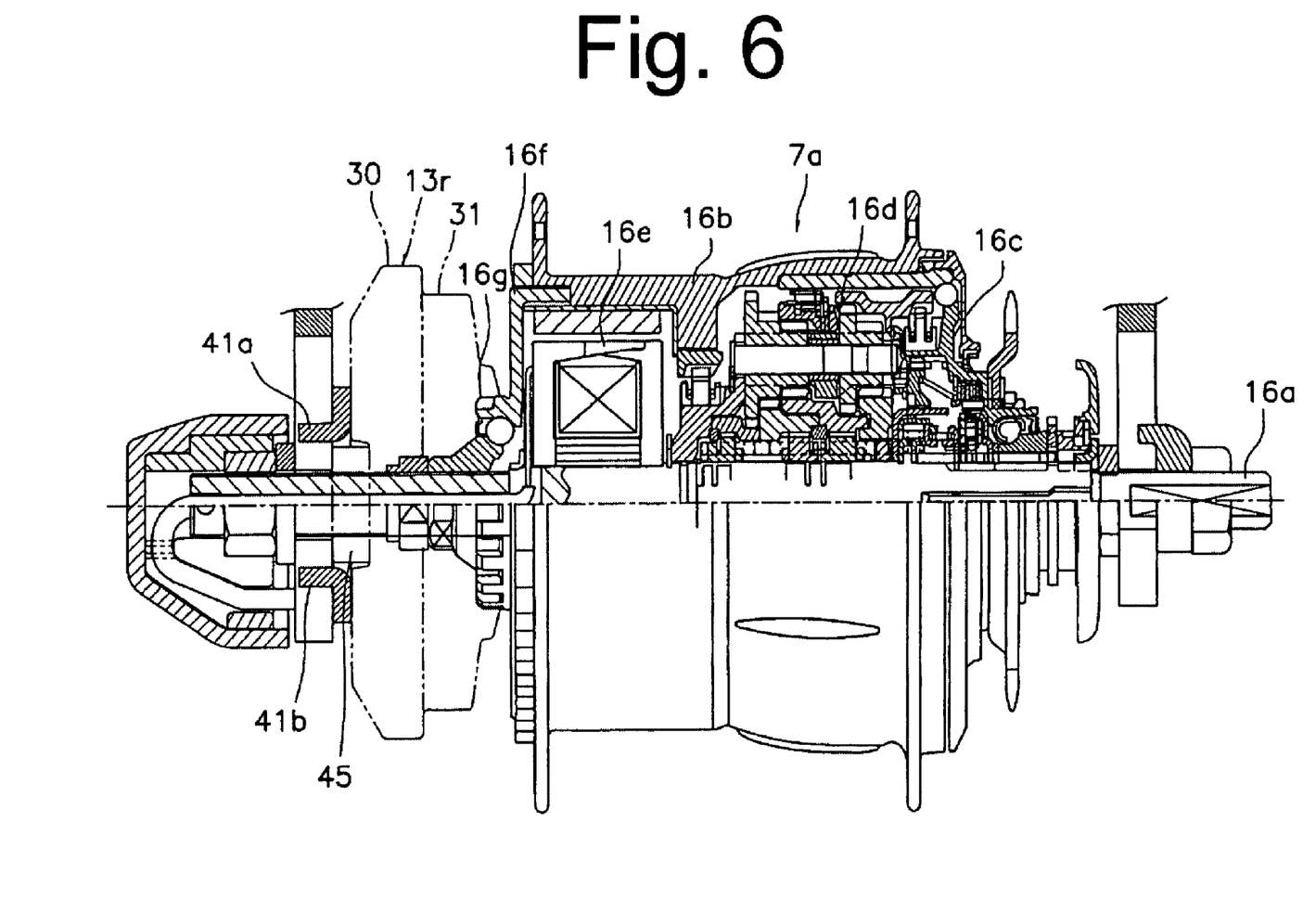
FIG. 6 is a partial cross sectional view of a rear wheel hub to which the rear brake device is attached.

Front wheel 6 and rear wheel 7 have front and rear hubs (rear hub 7a is shown in FIG. 6) rotatably supported by respective hub spindles 15a (FIG. 3) and 16a (FIG. 4), front and rear rims 6b and 7b (FIG. 1) disposed at the outside periphery of hubs 6b, tires 6c and 7c attached to front and rear rims 6b and 7b, and spokes 6d and 7d connecting the hubs 6a with the respective rims 6b and 7b. As shown in FIG. 3, hub spindle 15a is nonrotatably mounted on front fork 3 through front claws 3a, wherein each front claw 3a comprises a groove in the form of a slot that opens diagonally downward and toward the front. As shown in FIG. 4, hub spindle 16a is nonrotatably mounted to the ends of chain stays 2a of frame body 2 through rear claws 2b, wherein each rear claw 2b comprises a groove in the form of a slot that opens rearward.

Figure 2:
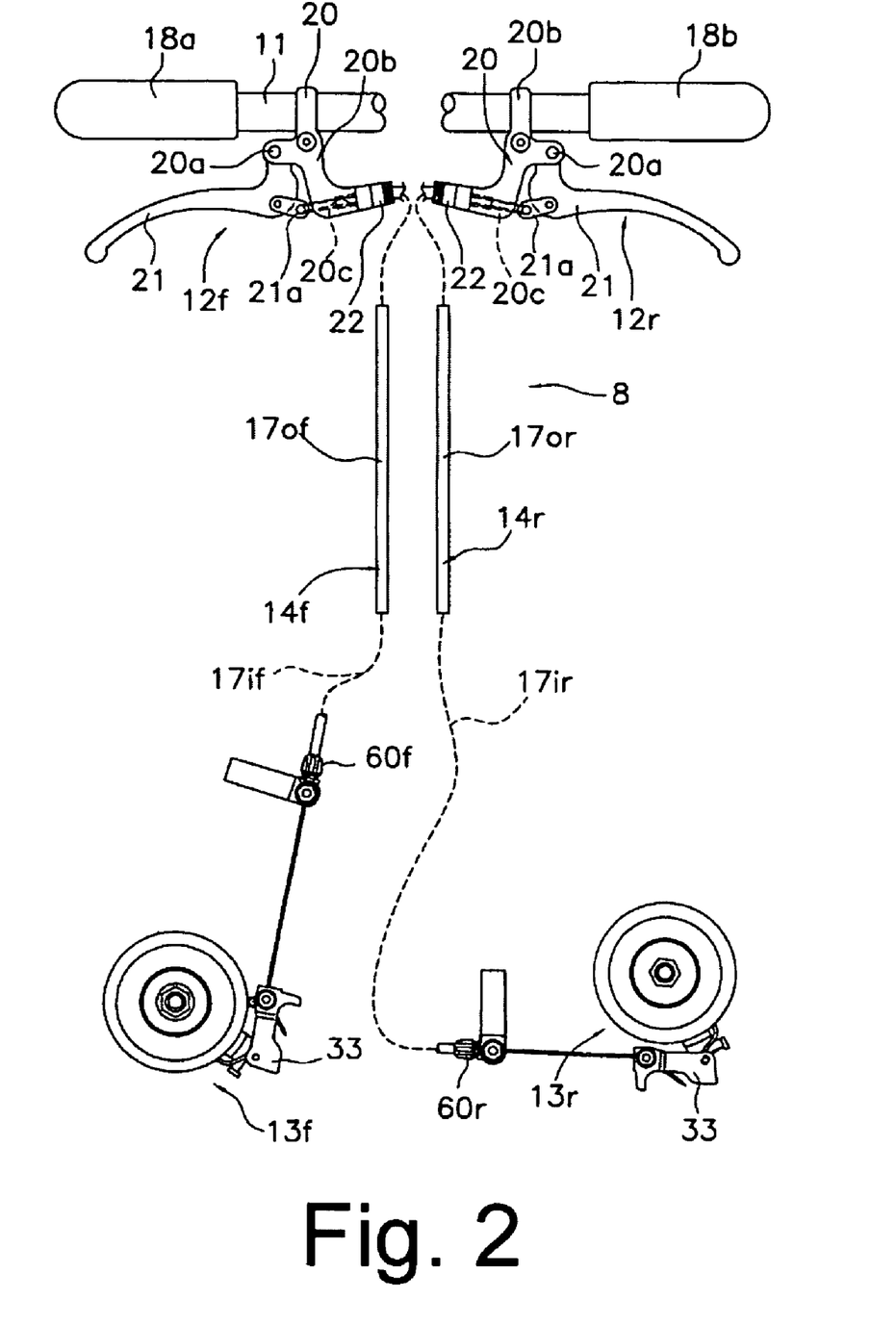
FIG. 2 is a schematic illustration of a particular embodiment of a brake system for the bicycle.

As shown in FIG. 2, brake system 8 has front and rear brake levers 12f and 12r, front and rear brake devices 13f and 13r actuated by front and rear brake levers 12f and 12r, respectively, and front and rear brake cables 14f and 14r respectively linking the front and rear brake levers 12f and 12r with the front and rear brake devices 13f and 13r. Brake cables 14f and 14r have inner cables 17if and 17ir, the opposite ends of which are linked to front and rear brake levers 12f and 12r and to front and rear brake devices 13f and 13r. Brake cables 14f and 14r also have outer cables 17of and 17or sheathing the inner cables 17if and 17ir. Front brake lever 12f is mounted to the inside of a grip 18a mounted on the left end of handlebar 11, and rear brake lever 12r is mounted to the inside of a grip 18b mounted on the right end of handlebar 11. Brake levers 12f and 12r are identical components disposed in a mirror image relationship. Each brake lever 12f and 12r has a lever bracket 20 mounted on handlebar 11, a lever member 21 pivotably supported on a pivot shaft 20a on lever bracket 20, and an outer cable detaining part 22 screwed into lever bracket 20 for locking its corresponding outer cable 17of or 17or in place. The other ends of the outer cables 17of 17or are locked in place by similar outer cable detaining parts 60f and 60r mounted to front fork 3 and chain stay 2a, respectively. Each lever bracket 20 has a mounting part 20b and a female threaded part 20c, wherein mounting part 20b is detachably mountable to handlebar 11, and outer cable detaining part 22 is threaded into female threaded part 20c. Inner cables 17if and 17ir pass through their respective outer cable detaining parts 22 and are detained by corresponding inner cable detaining parts 21a mounted to each lever member 21. Each lever member 21 is biased towards the brake release position by a biasing member (not shown).

In this embodiment, rear hub 7a comprises an eight speed internal hub transmission shown in FIG. 6. Hub 7a comprises hub axle 16a that is non-rotatably mounted to rear claws 2b of chain stay 2a of frame body 2, a hub shell 16b that is rotatably supported around hub axle 16a, a drive cylinder 16c that transmits rotational force from the bicycle chain to hub shell 16b, and a force transmission mechanism 16d that uses a planet gear mechanism to convert the rotational force of drive cylinder 16c into eight gear ratios and transmit the rotational force to hub shell 16b. An electricity generator 16e of known construction is disposed adjacent to force transmission mechanism 16d.

Figure 5:
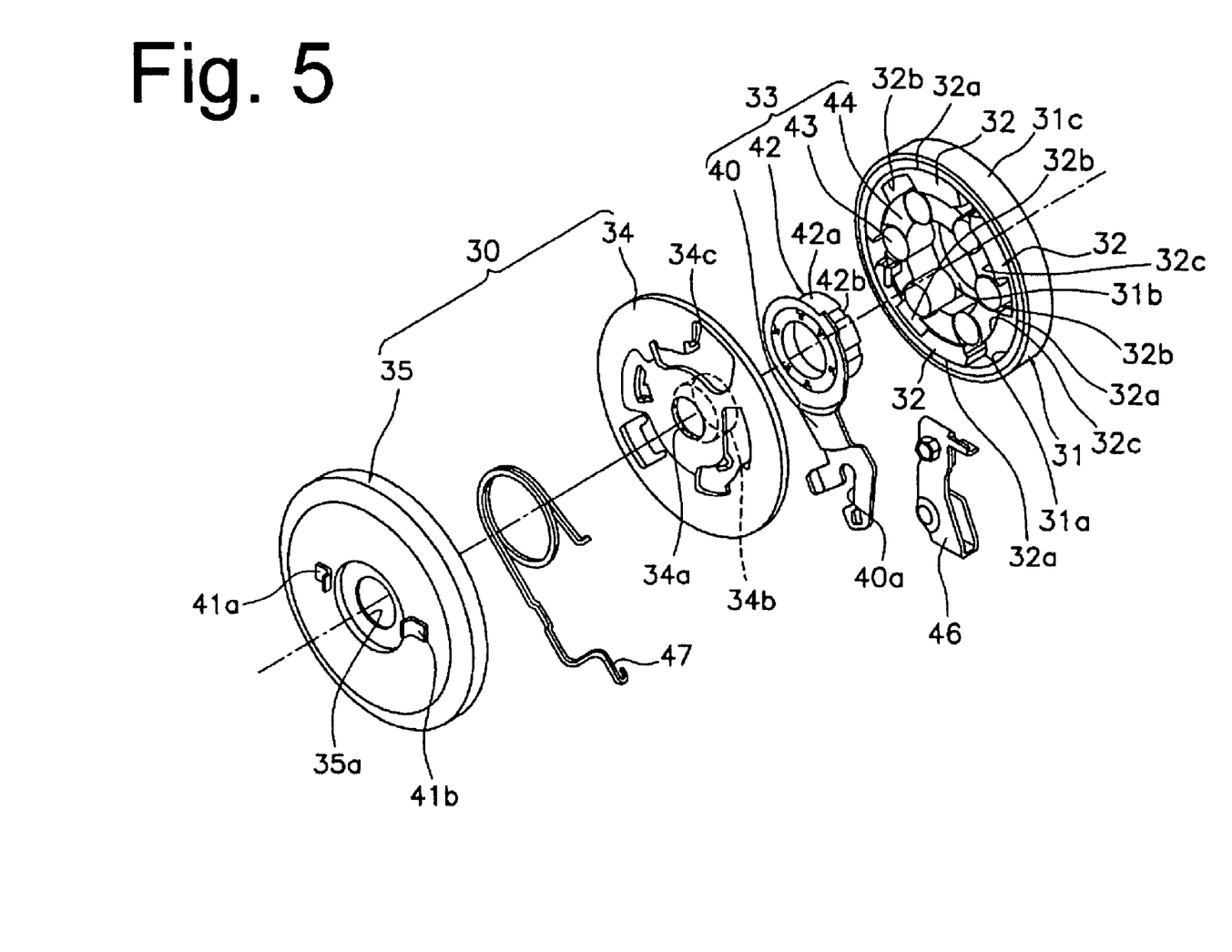
FIG. 5 is an exploded view of the rear brake device.

In this embodiment, front and rear brake devices 13f and 13r are roller brake devices that function to brake the hubs of front wheel 6 and rear wheel 7, respectively. Because front and rear brake devices 13f and 13r have substantially the same construction, only rear brake device 13r will be described in detail. As shown in FIGS. 4-5, rear brake device 13r comprises a securing bracket 30 that is nonrotatably secured to chain stay 2a, a braked member in the form of a brake drum 31 that has a braking surface 31a and is adapted to rotate with hub 7a, three braking members in the form of arcuate brake shoes 32, and a brake operating unit 33 that selectively causes brake shoes 32 to contact braking surface 31a.

Securing bracket 30 comprises a circular bracket main unit 34 and a circular cap-shaped cover member 35 that fits over and covers the outer surface of bracket main unit 34. Bracket main unit 34 may be press-formed from a steel plate, for example, and cover member 35 may be nonrotatably coupled to bracket main unit 34 by crimping or screwing. Axle openings 34a and 35a are formed in bracket main unit 34 and cover member 35, respectively, for receiving hub axle 16a therethrough. A nut 45 (FIG. 6) screws onto hub axle 16a to secure bracket main unit 34 and cover member 35 in place on hub axle 16a.

Bracket main unit 34 includes a cylindrical arm mounting part 34b that protrudes toward brake drum 31 for movably (e.g., rotatably) supporting an operating arm 40 of brake operating unit 33 therein. Three locking protrusions 34c protrude from an inner side surface of bracket main unit 34 toward brake drum 31 and extend into corresponding locking concavities 32b in brake shoes 32 to prevent circumferential movement of brake shoes 32 when brake shoes 32 contact braking surface 31a of brake drum 31.

Bracket main unit 34 also includes a locking unit in the form of first and second locking members 41a and 41b that extend laterally outward from the outer surface of bracket main unit 34 in the direction of hub axle 16a toward chain stay 2a. Locking members 41a and 41b are positioned on opposite sides of hub axle 16a and axle opening 35a and take into account the alignment of brake operating unit 33 and rear claw 2b. Locking members 41a and 41b may comprise bent plate members having a width that is slightly smaller than the width of the groove formed by claw 2b of chain stay 2a so that they may be inserted into the groove as shown in FIG. 4. As a result, locking members 41a and 41b prevent securing bracket 30 from rotating relative to chain stay 2a. Locking members 41a and 41b fulfill the same function as the arm disposed on a conventional securing bracket. Locking members 41a and 41b may be detachably or permanently secured to the surface of cover member 35 using an appropriate securing means, such as welding, adhesion or screwing, or by forming locking members 41a and 41b integrally with cover member 35. For example, locking members 41a and 41b may be formed by bending parts of the surface of cover member 35.

Brake drum 31 is a generally cylindrical member made of a stainless steel alloy. As shown in FIG. 5, brake drum 31 has braking surface 31a, a bottom wall 31b, and a cylindrical outer wall 31c that extends from the outer peripheral edge of bottom wall 31b. Bottom wall 31b defines a central opening with inner peripheral splines (not shown) that nonrotatably engage outer peripheral splines 16g (FIG. 6) formed on a stepped portion of a left sleeve 16f attached to hub shell 16b. As a result, brake drum 31 is nonrotatably mounted to hub shell to that brake drum 31 and hub shell 16b rotate as a unit.

Brake shoes 32 are formed as arc-shaped segments, wherein braking surfaces 32a form the outer peripheral surfaces thereof, and the locking concavities 32b that engage with the locking protrusions 34c on bracket main unit 34 are formed on inner peripheral surfaces 32c thereof. A conventional spring member (not shown) biases brake shoes 32 radially inwardly in a known manner.

Brake operating unit 33 is rotatably mounted on securing bracket 30 and selectively causes brake shoes 32 to come into pressure contact with braked surface 31a of brake drum 31. Brake operating unit 33 comprises operating arm 40, an inner cable mounting part 46, a cam member 42, a plurality of (e.g., six) rollers 43, and a roller retainer 44. Operating arm 40 may be formed by cutting and pressing a metal plate, and the distal end of operating arm 40 includes a mounting slot 40a for detachably mounting inner cable mounting part 46. Inner cable mounting part 46 is used to attach inner cable 17ir of brake cable 14r to operating arm 40 to that rotating brake lever 12r on handlebar 11 causes operating arm 40 to rotate around hub axle 16a between a brake release position and a braking position. One end of a coil spring member 47 is attached to bracket main unit 34, and the other end of spring member 47 is attached to operating arm 40 so that operating arm 40 is biased clockwise toward the brake release position.

Cam member 42 is nonrotatably crimped to operating arm 40 so that cam member 42 rotates as a unit with operating arm 40. Cam member 42 is a thick cylindrical member made of iron steel, for example. The outer peripheral surface of cam member 42 forms a plurality of cam surfaces 42a and a plurality of depressions 42b that are interleaved with the plurality of cam surfaces 42a. In this embodiment, cam surfaces 42a are angled such that the radial distances of cam surfaces 42a gradually increase in a clockwise direction.

Rollers 43 are retained in a spaced apart relation by roller retainer 44. Rollers 43 are sandwiched between and contact both cam member 42 and the inner peripheral surfaces 32c of brake shoes 32. Roller retainer 44 includes a plurality of axially extending roller retaining protrusions (not shown) that axially retain rollers 43 to roller retainer 44 in a known manner. Roller retainer 44 also includes locking protrusions (not shown) that nonrotatably secure roller retainer 44 to bracket main unit 34.

Counterclockwise rotation of operating arm 40 causes cam surfaces 42a to push rollers 43 radially outwardly to push brake shoes 32 toward braking surface 31a in brake drum 31. Clockwise rotation of operating arm 40 to the brake release position allows rollers 43 to move radially inwardly and allow brake shoes 32 to move radially inwardly to their inoperative positions. In this embodiment, each brake shoe 32 receives pressure from two rollers 43.

The assembly and operation of the brake system 8 will now be described. Inner cables 17if are 17ir are in a tensioned state when brake cables 14f and 14r are installed. The amount of play between brake shoes 32 and braking surface 31a of brake drum 31 when the brake levers 12f and 12r are in their non-operating state is adjusted using the outer cable detaining parts 22 mounted to brake levers 12f and 12r and/or the outer cable detaining parts 60f and 60r mounted to front and rear brake devices 13f and 13r. When the rear brake lever 12r is operated (i.e., pulled), inner cable 17ir is pulled against the biasing force of spring member 47, and operating arm 40 moves counterclockwise from the brake release position toward the braking position.

As operating arm 40 moves toward the braking position, cam member 42 rotates in tandem therewith, rollers 43 ride up the angled cam surfaces 42a and move radially outwardly, and brake shoes 32 are pushed toward braking surface 31a of brake drum 31. Because securing bracket 30 cannot rotate relative to frame body 2 due to locking members 41a and 41b, and since brake shoes 32 are nonrotatably secured to bracket main unit 34 through locking concavities 32b and locking protrusions 34c, respectively, a braking force proportional to the degree of pressure exerted by the brake shoes 32 is achieved.

When the rider releases rear brake lever 12r, operating arm 40 returns to the brake release position in accordance with the biasing force of spring member 47, rollers 43 ride down the angled cam surfaces 42a of cam member 42, and brake shoes 32 move radially inwardly away from braking surface 31a of brake drum 31.

Because securing bracket 30 is nonrotatably locked in place relative to frame body 2 by locking members 41a and 41b that extend in the axial direction of hub axle 16a rather than by a radially extending brake arm as in the prior art, a bracket securing that is banded or welded to frame 2 is not required. This simplifies the construction of the nonrotatably locked securing bracket 30. Furthermore, because there is no radially extending arm, securing bracket 30 is not subject to conventional design limitations and can be made more visually attractive.

FIG. 3 shows another embodiment of a securing bracket 30f applied to front brake device 13f. In this embodiment, securing bracket 30f is prevented from rotating relative to front fork 3 by extending a securing bolt 52 through a hole in front fork 3 into a threaded opening (not shown) in securing bracket 30f.

Figure 7:
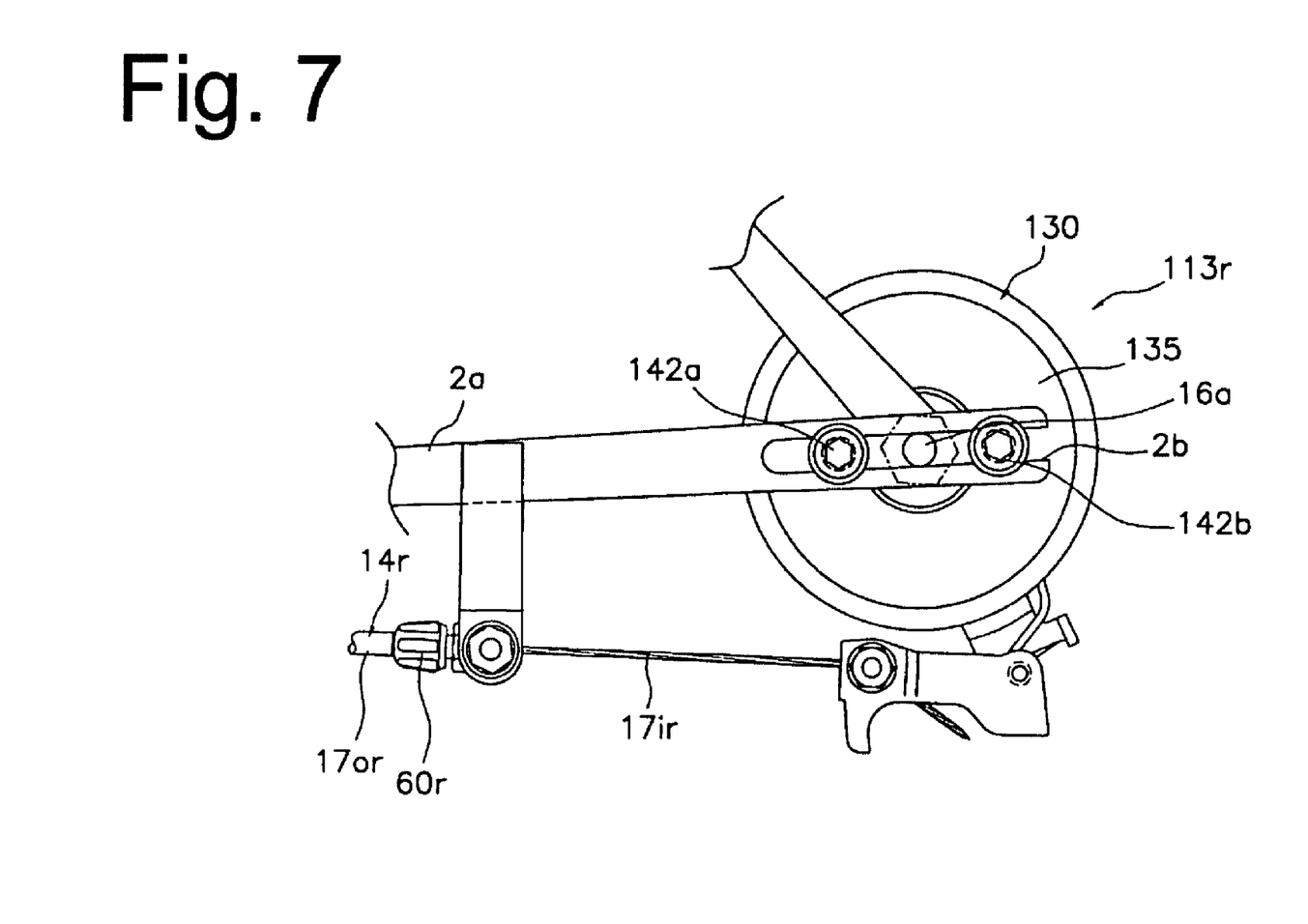
FIG. 7 is a side view of another embodiment of a rear brake device.
Figure 8:
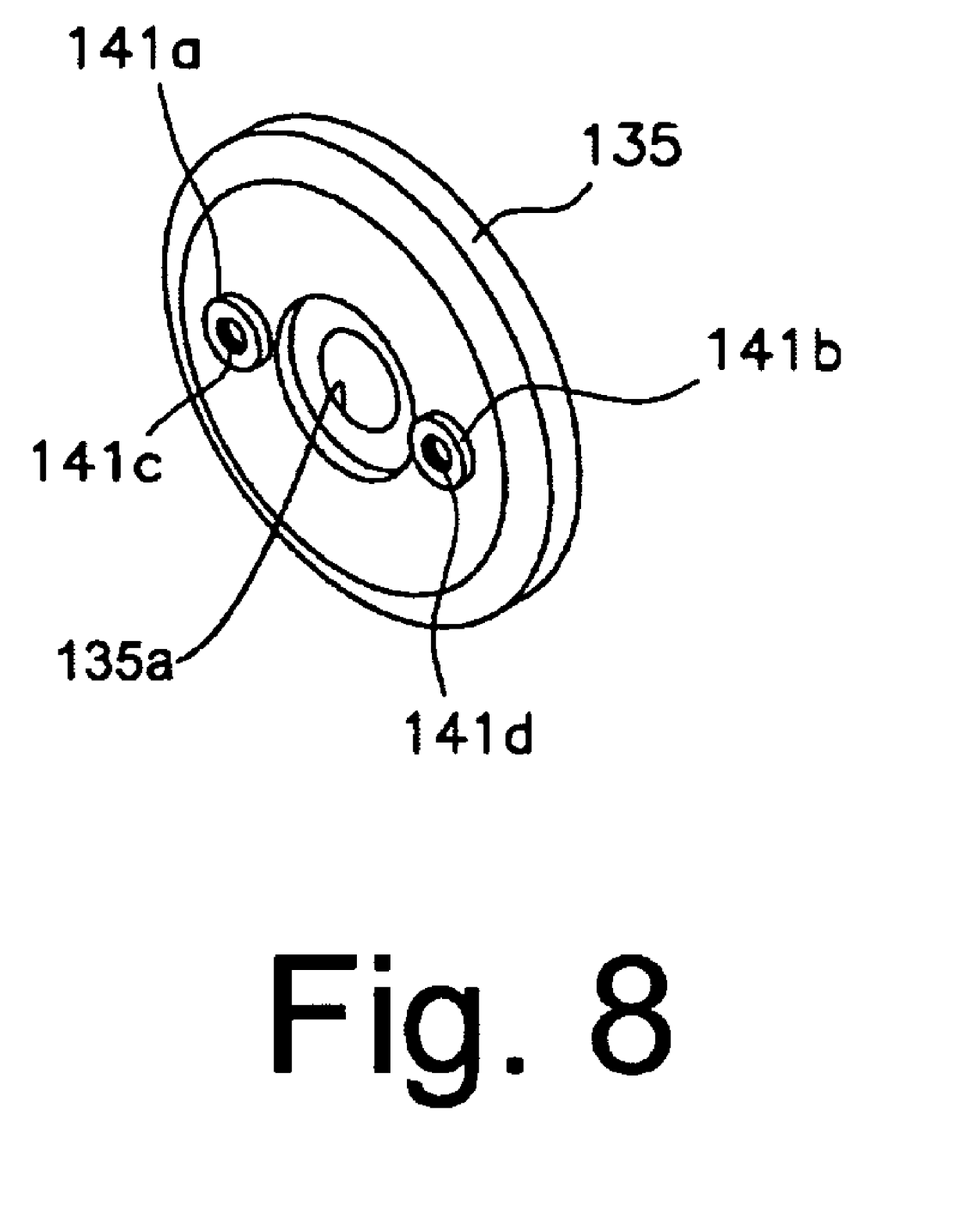
FIG. 8 is a more detailed view of a cover member for the brake device shown in FIG. 7.
Figure 9:
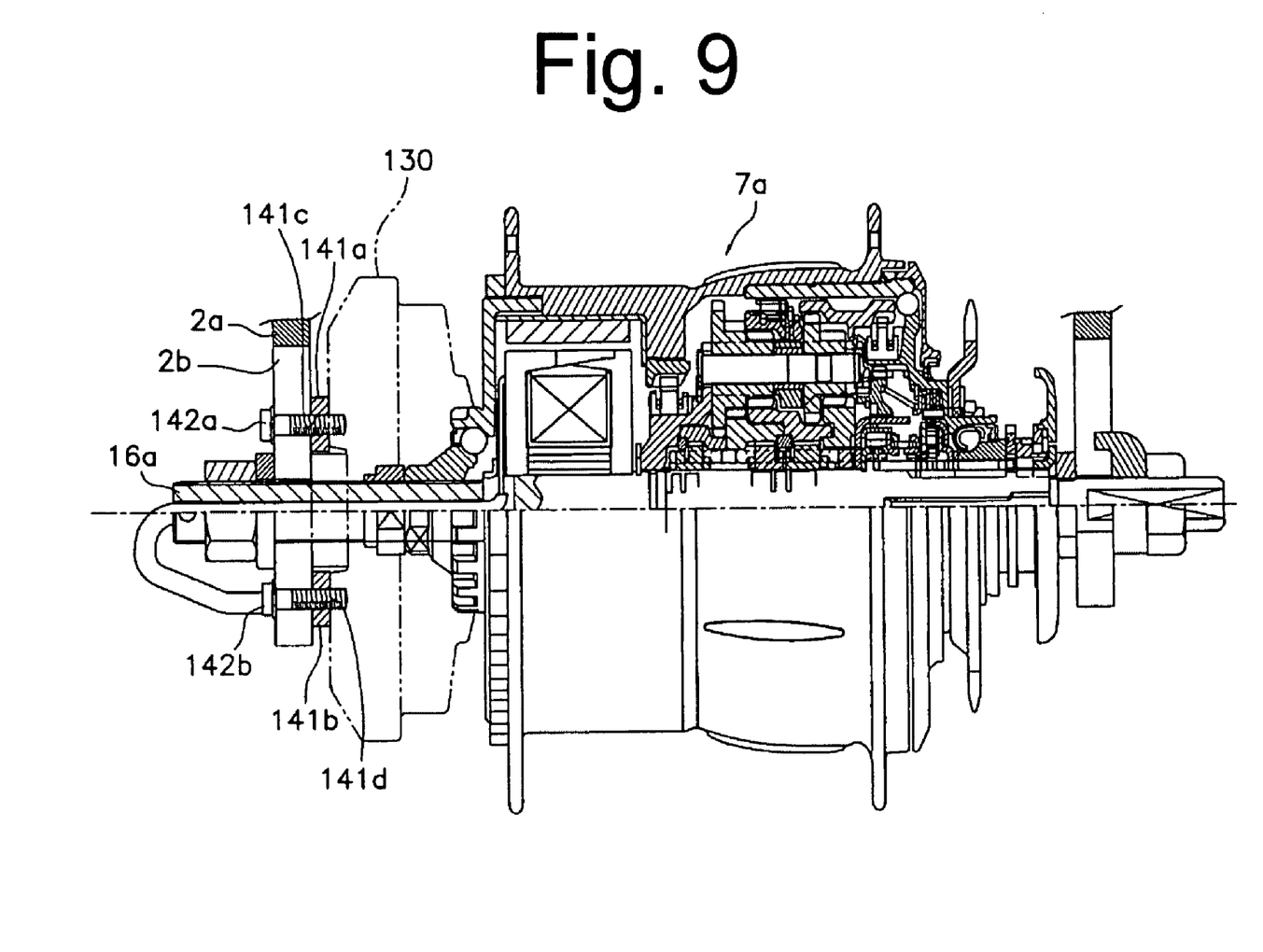
FIG. 9 is a partial cross sectional view of a rear wheel hub to which the rear brake device shown in FIG. 7 is attached.

FIGS. 7-9 show another embodiment of a securing bracket 130 applied to a rear brake device 1113r. In this embodiment, securing bracket 130 is secured by locking members 141a and 141b disposed on the outer surface of a cover member 135 on opposite sides of axle opening 135a, wherein locking members 141a have respective screw holes 141c and 141d. Securing bolts 142a and 142b having a diameter slightly smaller than the width of the groove formed by rear claw 2b pass through the groove and screw into screw holes 141c and 141d, thereby also directly fastening cover plate 135 to rear claw 2b.

Figure 10:
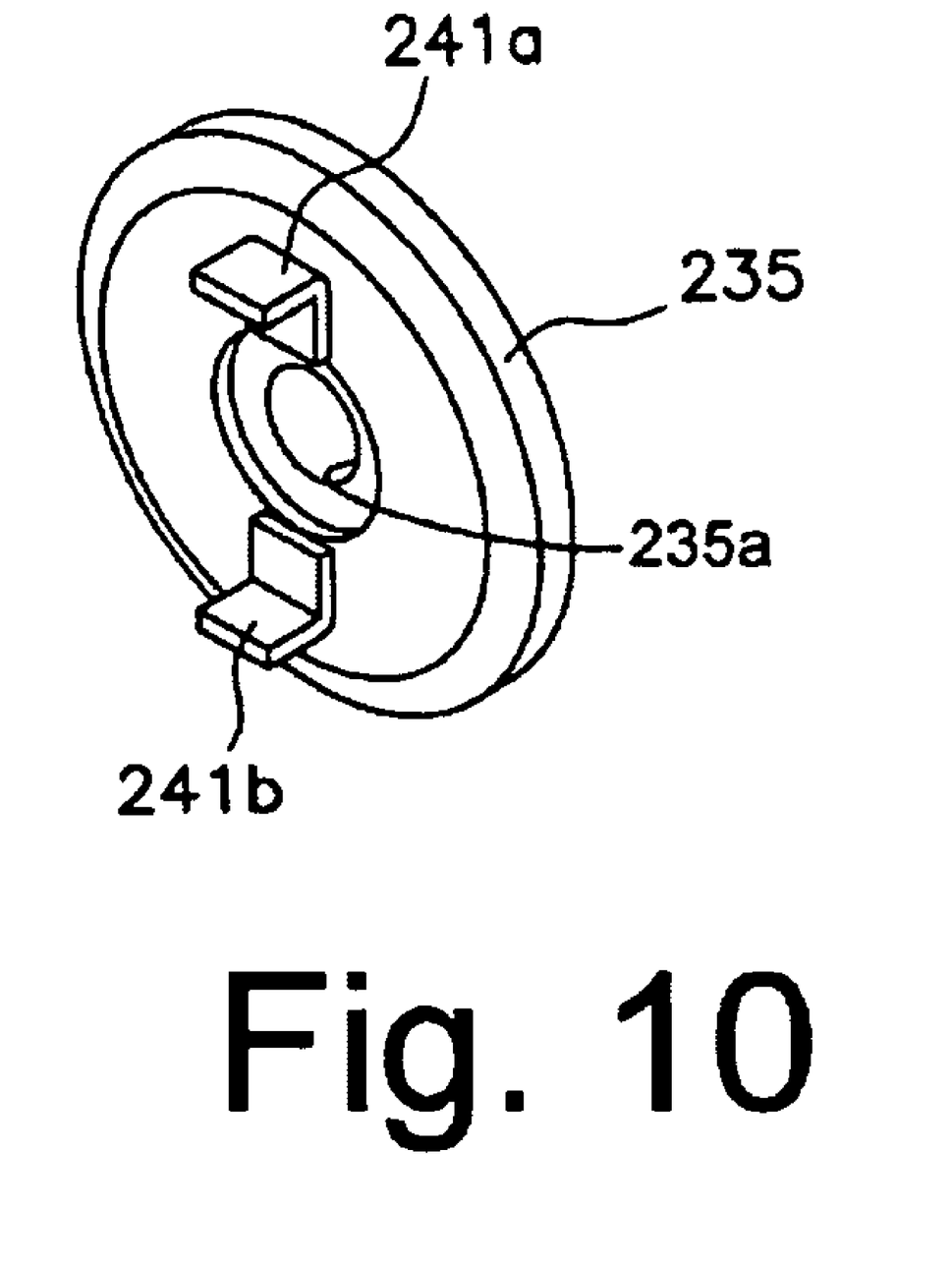
FIG. 10 is a detailed view of an alternative embodiment of a cover member.
Figure 11:
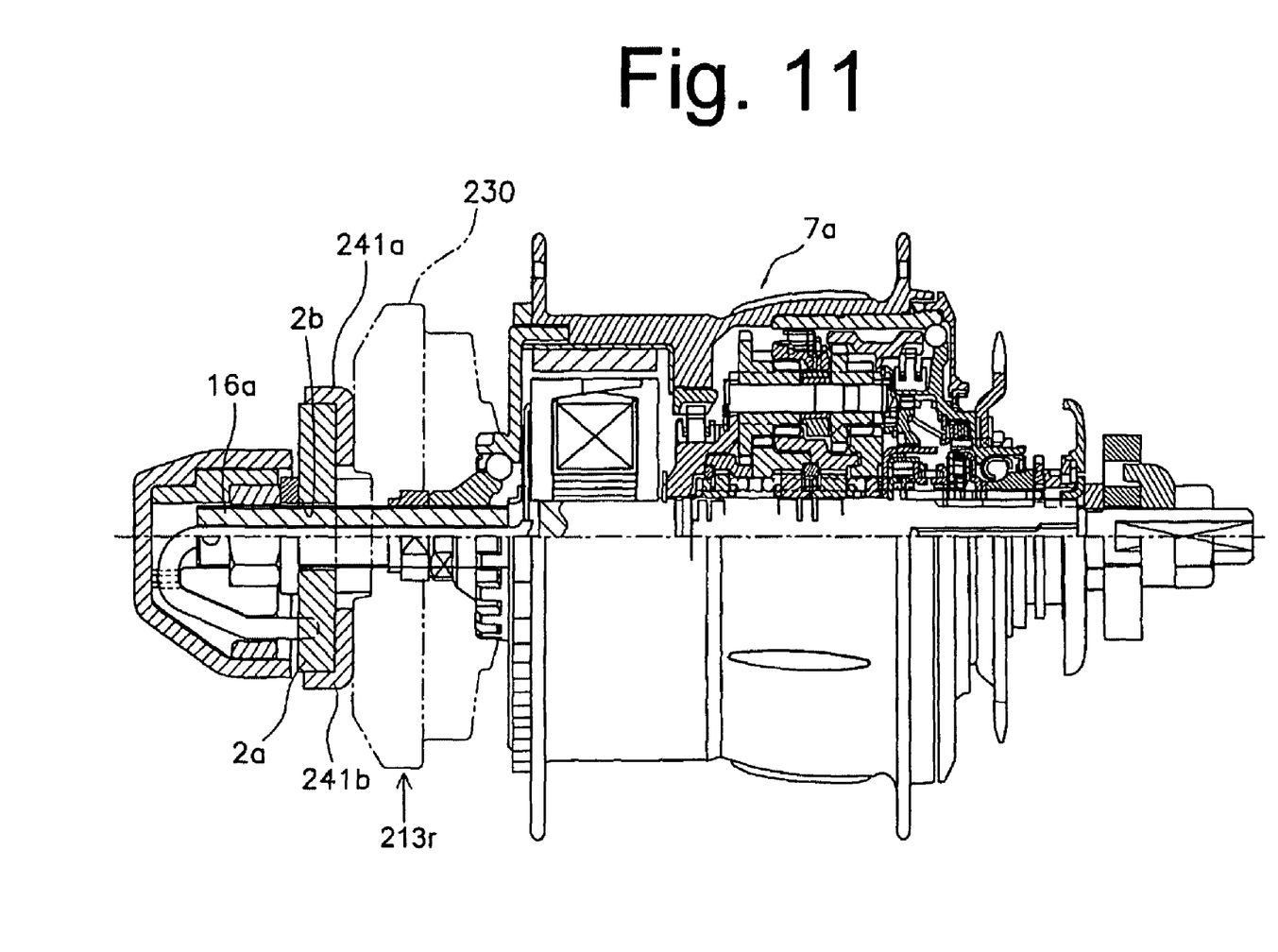
FIG. 11 is a partial cross sectional view of a rear wheel hub to which a rear brake device that includes the cover member shown in FIG. 10 is attached.

FIGS. 10-11 show another embodiment of a securing bracket 230 applied to a rear brake device 213r. In this embodiment, bent locking members 241a and 241b are disposed on a cover member 235 of securing bracket 230 above and below chain stay 2a. In this case, it is preferred that locking members 241a and 241b are rotated 90° from the positions of the locking members in the previous embodiments to properly grip chain stay 2a.

While the above is a description of various embodiments of inventive features, further modifications may be employed without departing from the spirit and scope of the present invention. For example, while the above embodiments used a roller-type hub brake, the teachings herein also may be applied to a band brake or a drum brake that brakes the hub. While a pair of locking members were used in the above embodiments, only one locking member may be used as long as it serves to prevent the securing bracket from undesirably rotating relative to the frame. While a circular securing bracket was used in the described embodiments, the securing bracket may be polygonal rather than circular so long as no part of it extends radially outward to an extreme extent.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle brake apparatus adapted to be mounted to a bicycle frame, wherein the apparatus comprises:
    a securing bracket with an axle opening dimensioned to receive a bicycle wheel hub axle therethrough;
    a braked member that has a braking surface and is adapted to rotate with a bicycle wheel hub rotatably supported by the hub axle;
    a braking member adapted to contact the braking surface;
    an operating unit including an actuating arm that selectively causes the braking member to contact the braking surface in response to rotation of the actuating arm; and
    a locking unit structured for attachment to the securing bracket, wherein the locking unit extends in an axial direction of the hub axle and is dimensioned to nonrotatably engage the bicycle frame radially inwardly of a rotating portion of the brake apparatus;
    wherein the locking unit comprises a first threaded member dimensioned to be inserted into a hub axle mounting slot formed in the bicycle frame and attached to the securing bracket at an attachment location, wherein the attachment location aligns with the hub axle mounting slot and is disposed radially outwardly from the axle opening; and wherein the locking unit is coupled to the braking member to prevent the braking member from rotating around the axle opening.

2. The apparatus according to claim 1 wherein the first threaded member is configured to clamp the securing bracket to the bicycle frame.

3. The apparatus according to claim 1 wherein the actuating arm is disposed axially between the locking unit and the braking member so that the actuating arm rotates relative to the locking unit and the braking member.

4. The apparatus according to claim 1 wherein the securing bracket includes a first opening at the attachment location, and wherein the first threaded member is inserted into the first opening.

5. The apparatus according to claim 4 wherein the first opening comprises a first threaded opening, and wherein the first threaded member screws into the first threaded opening.

6. The apparatus according to claim 4 wherein the first threaded member is configured to clamp the securing bracket to the bicycle frame.

7. The apparatus according to claim 4 wherein the locking unit further comprises a first locking member dimensioned to fit within the hub axle mounting slot, wherein the first locking member includes the first opening.

8. The apparatus according to claim 7 wherein the first opening comprises a first threaded opening.

9. The apparatus according to claim 7 wherein the first threaded member is configured to clamp the securing bracket to the bicycle frame.

10. The apparatus according to claim 4 wherein the locking unit further comprises a second threaded member dimensioned to be inserted into the hub axle mounting slot and into a second opening at the securing bracket, wherein second opening aligns with the hub axle mounting slot and is disposed radially outwardly from the axle opening.

11. The apparatus according to claim 10 wherein the first opening comprises a first threaded opening, and wherein the first threaded member screws into the first threaded opening.

12. The apparatus according to claim 11 wherein the second opening comprises a second threaded opening, and wherein the second threaded member screws into the second threaded opening.

13. The apparatus according to claim 10 wherein the first threaded member is configured to clamp the securing bracket to the bicycle frame.

14. The apparatus according to claim 13 wherein the second threaded member is configured to clamp the securing bracket to the bicycle frame.

15. The apparatus according to claim 10 wherein the axle opening is disposed between the first opening and the second opening.

16. The apparatus according to claim 15 wherein the first opening comprises a first threaded opening, and wherein the first threaded member screws into the first threaded opening.

17. The apparatus according to claim 16 wherein the first threaded member is configured to clamp the securing bracket to the bicycle frame.

18. The apparatus according to claim 15 wherein the first opening comprises a first threaded opening, wherein the first threaded member screws into the first threaded opening, and wherein the first threaded member is configured to clamp the securing bracket to the bicycle frame.

19. The apparatus according to claim 18 wherein the second opening comprises a second threaded opening, wherein the second threaded member screws into the second threaded opening, and wherein the second threaded member is configured to clamp the securing bracket to the bicycle frame.

20. The apparatus according to claim 15 wherein the locking unit further comprises a first locking member dimensioned to fit within the hub axle mounting slot, wherein the first locking member includes the first opening.

21. The apparatus according to claim 20 wherein the locking unit further comprises a second locking member dimensioned to fit within the hub axle mounting slot, wherein the second locking member includes the second opening.

22. The apparatus according to claim 21 wherein the first opening comprises a first threaded opening, wherein the first threaded member screws into the first threaded opening, and wherein the first threaded member is configured to clamp the securing bracket to the bicycle frame.

23. The apparatus according to claim 22 wherein the second opening comprises a second threaded opening, wherein the second threaded member screws into the second threaded opening, and wherein the second threaded member is configured to clamp the securing bracket to the bicycle frame.

* * * * *